United States Patent [19]

Bell

[11] Patent Number: 4,711,932
[45] Date of Patent: Dec. 8, 1987

[54] POLYETHER-POLYESTER GRAFT COPOLYMER

[75] Inventor: Vernon L. Bell, Yorktown, Va.

[73] Assignee: The United States of America as represented by the Administrator of the National Aeronautics and Space Administration, Washington, D.C.

[21] Appl. No.: 855,879

[22] Filed: Apr. 24, 1986

[51] Int. Cl.$^4$ .............................................. C08L 71/04
[52] U.S. Cl. ..................................... 525/397; 525/905
[58] Field of Search ................. 525/397, 905; 528/212

[56] References Cited

U.S. PATENT DOCUMENTS 3,262,911 7/1968 Hay ...................................... 528/212
3,402,143 9/1968 Hay ...................................... 528/212

FOREIGN PATENT DOCUMENTS 1205093 9/1970 United Kingdom ................ 525/397

*Primary Examiner*—Jacob Ziegler
*Attorney, Agent, or Firm*—George F. Helfrich; John R. Manning; Harry Lupuloff

[57] ABSTRACT

A polyether graft copolymer with improved solvent resistance and crystalline thermally reversible crosslinks. The copolymer is prepared by a novel process of anionic copolymerization. Polymers formed in this manner have good solvent resistance and are well suited for commercial aircraft parts.

6 Claims, 1 Drawing Figure

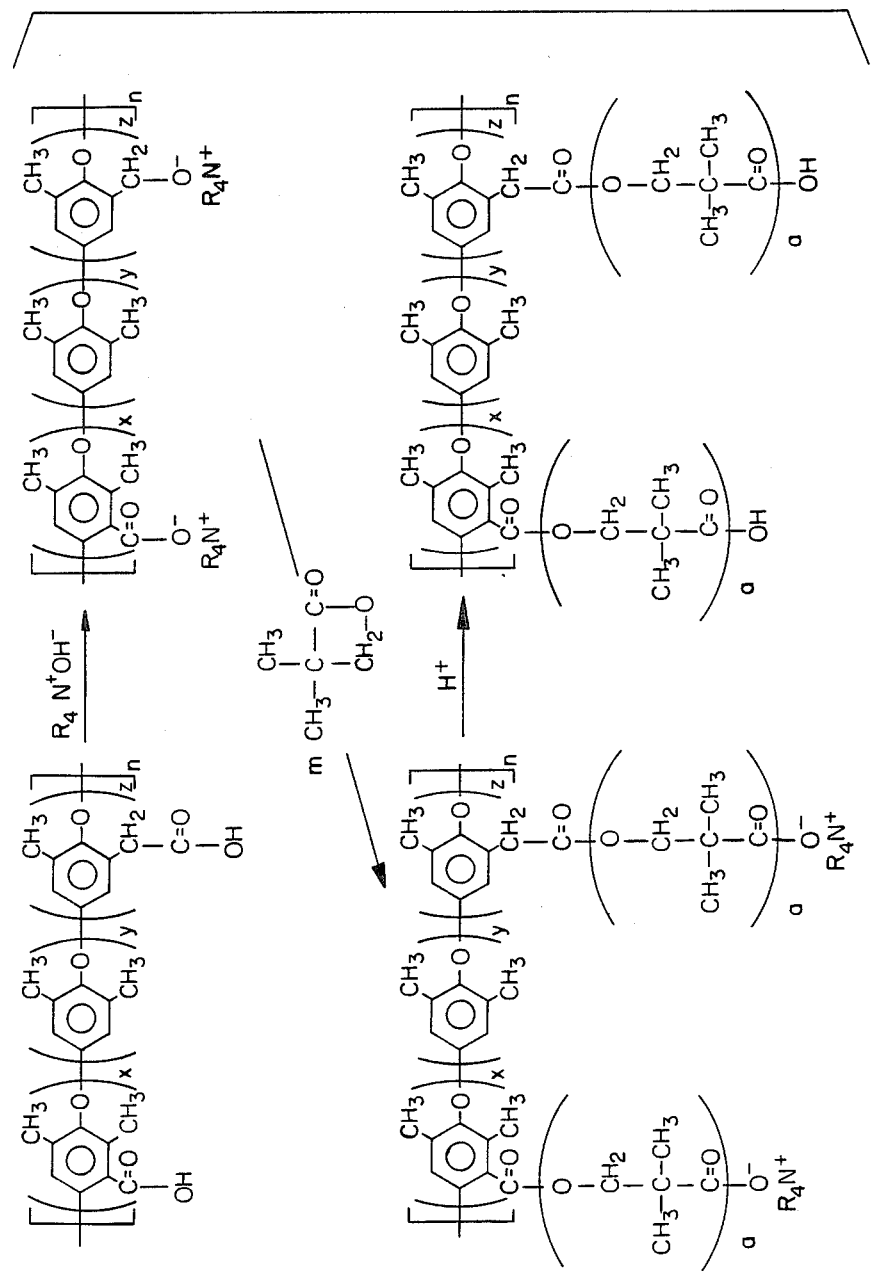

4,711,932

POLYETHER-POLYESTER GRAFT COPOLYMER

ORIGIN OF THE INVENTION

The invention described herein was made by employees of the U.S. Government and its assignees and may be manufactured and used by or for the Government for government purposes without payment or any royalties therein or therefor.

FIELD OF THE INVENTION

This invention relates to novel copolymers having polypivalolactone segments grafted onto a poly(2,6-dimethylphenylene oxide) backbone and to a method of preparation thereof. The polymers form strong materials with improved solvent resistance and crystalline, thermally reversible crosslinks.

BACKGROUND OF THE INVENTION

This invention relates to the preparation of useful aromatic polyethers, and more particularly to the preparation of aromatic polyethers with improved solvent resistance and reduced melting temperatures, yet with thermally-reversible cross-linking properties, resulting from the grafting of crystallizable polyester segments onto the polyether backbone.

Aromatic polyethers, also well known as polyphenylene oxides, are a class of polymeric materials which have been used in a wide variety of applications. However, they have certain deficiencies which detract from their usefulness. For instance, they are soluble in several common solvents, including the halocarbon and aromatic hydrocarbon types of paint thinners and removers. This solvent sensitivity can limit their use in structural articles which must be painted and repainted. Furthermore, the popular commercially available polyether, poly(2,6-dimethylphenylene oxide), is a very high melting plastic, and as such, is more difficult to fabricate into finished parts than is desired. Traditionally, attempts to improve the solvent resistance of thermoplastics have involved the incorporation of certain thermosettable chemical entities, such as acetylenic groups, onto the base polymer, thus eliminating the thermoplastic nature of the polymer and at the same time converting it to a solvent resistant material. However, that approach, which has not yet been accomplished for aromatic polyethers, has the disadvantage of being irreversible, so that it is not possible to reprocess the cross-linked polymer.

Efforts to reduce the melting temperature of polyphenylene oxides have, for the most part, centered on blending lower softening or melting polymers with the polyether to give resin mixtures which can be processed at an overall lower temperature than the polyether by itself. While this method can give some improvement, it also compromises the ultimate properties of the polyphenylene oxide, causing its use to be limited to much lower temperatures. That method also fails to improve the solvent sensitivity of the polyphenylene oxide.

Polyphenylene oxide compositions have been disclosed by Schmukler in U.S. Pat. No. 3,396,146. Schmukler discloses a polyphenylene oxide which has a repeating unit containing a single aromatic ring substituted with two monovalent substituents. This differs from the present invention in two significant ways. First, the repeating unit of the present invention contains three forms of aromatic rings in varying proportions including the unmodified polyphenylene oxide unit and two modified polyphenylene oxide units. Second, the present invention has polypivalolactone grafts which are not present in the Schmukler polymer.

Hay, in U.S. Pat. No. 3,402,143 also discloses polyphenylene oxide compositions. This reference is distinguishable on the same grounds as is the Schmukler patent.

A process for producing graft copolymers comprising polyphenylene ether is disclosed by Miyashita, et al. in U.S. Pat. No. 4,456,736. This graft polymerization does not include the use of polypivalolactone grafts of the present invention. Also, the method of producing these graft copolymers as described by Miyashita, et al. is significantly different from the process of the present invention.

All of these prior art patents suffer from the disadvantage that they do not describe a product which has the desirable properties possessed by the composition of the present invention. Accordingly, the present invention represents a significant advance over the prior art.

SUMMARY OF THE INVENTION

The present invention provides a graft copolymer composition which comprises polypivalolactone units grafted onto a polyphenylene oxide polymer backbone, and a novel process for producing these graft copolymers.

Preferred copolymer compositions include the reaction product of a substituted poly(2,6-dimethylphenylene oxide) and pivalolactone.

DETAILED DESCRIPTION OF THE PREFERRED EMBODIMENT

The process for preparing the copolymers of this invention utilizes a modified form of polyphenylene oxide, one which has various quantities of organic carboxylic acid groups substituted in the base polyether. This substitution is readily accomplished by metallation of the polyether, followed by treatment with carbon dioxide (A. J. Chalk and A. S. Hay, *Journal of Polymer Science*, A-1, 7, 691 (1969)). A portion of the carboxylic acid groups, from 1 to 100%, but generally 10 to 50%, are converted to salts, such as quaternary ammonium salts or other appropriate salts known by those skilled in the art. Tetrabutylammonium carboxylate salts are suitable. The resulting carboxylate salt-modified polyethers, dissolved in suitable solvents, are then reacted with varying amounts of pivalolactone ($\alpha$, $\alpha'$-dimethylpropiolactone), the graft polymerization of which is initiated by the carboxylate anions. The graft copolymerization proceeds rapidly to completion. Lastly, the treatment of the grafted copolymer with a mineral acid then converts the terminal tetrabutylammonium carboxylate salts to free carboxylic acid groups, thus completing the grafting operation.

The chemical equations for the graft polymerization are represented in FIG. 1. The sum of x, y and z is always one and x, y and z are each greater than 0. Also, despite the fact that FIG. 1 shows the use of a quaternary ammonium salt, the invention is not to be limited to this class of salts. Although quaternary ammonium salts are the preferred salts for this process, use of other appropriate salts is not excluded. The integer "n" can be any integer ranging from 10 to 10,000. The letter "m" indicates the number of moles of pivalolactone which are introduced into the reaction vessel. The preferred number of moles "m" to be introduced into the reaction vessel is 1 to 50 times the quantity "n" moles of polyphenylene oxide.

This reaction is carried out in solution. Although tetrahydrofuran is the preferred solvent, other solvents are useful as well. Meta cresol, for example, may be used for this reaction, although this solvent tends to cause some molecular weight degradation.

The final step of the reaction involves acidifying the solution to convert the terminal quaternary ammonium salts to carboxylic acid groups. For this step any suitable proton source such as hydrochloric acid, nitric acid, or sulfuric acid may be used. Hydrochloric acid is the preferred proton source.

Several of the reaction parameters may be varied in order to alter the properties of the graft copolymers. First, the molecular weight of the polyether starting material can be varied to affect mechanical and other properties. A suitable molecular weight range is 1,000 to 1,000,000, a preferred molecular weight range is 5,000 to 500,000. The degree of carboxylation and thus, the number of graft sites available, is another factor influencing the nature of the copolymer. A suitable range is 5 to 95% carboxyl groups based on the number of phenylene oxide moieties in the polymer. The lengths of the grafted polypivalolactone segments, as determined by both the degree of carboxylation and the amount of pivalolactone (PVL) monomer which is polymerized, determine the final balance of properties between those of the parent polyphenylene oxide and those of the highly crystalline polypivalolactone segments. A suitable range for "a" is 1 to 1,000, and a preferred range is 1 to 100.

In the same way that grafting has been reported to change elastomeric properties, the grafted copolyether-polyester displays properties markedly different from the base polyphenylene oxide and its carboxylated derivative. However, in contrast to the increase in the polymer melting points reported for the PVL-grafted aliphatic plastics such as the ethylene-propylene-diene elastomers, poly(ethylene-vinyl acetate-methacrylic acid), etc., the melting points of the PVL-grafted polyphenylene oxides according to the present invention generally are decreased to levels corresponding to the crystalline melting points of the polypivalolactone segments. For example, polyxylenol melts above 250° C. and must be processed at temperatures approaching 300° C. or above. However, the grafting of polypivalolactone segments promises to facilitate the processing of polyxylenols modified in accordance with the present invention.

A summary of various graft copolymers according to the present invention and their properties is given in Table I. The graft copolymers are prepared mostly in tetrahydrofuran, invariably leading to precipitation of the polymers from hot THF (except for polymer VI, which had short grafts of PVL and so remains soluble). Two polymers, VIII and IX, are grafted in m-cresol, in which the copolymers remain soluble throughout the grafting reaction. However, while the THF process appears to cause no degradation in molecular weight, as suggested by no decrease in solution viscosity, the two copolymers grafted in m-cresol suffer significant losses in inherent viscosity, indicating some degradation occurs. Since differential scanning calorimetry (DSC) shows no endotherms near 245° C., the melting point of polypivalolactone, it is concluded that no substantial homopolymerization of pivalolactone occurrs.

Those polymers which have similar viscosities, (III, IV, VI and VII) seem to show a loose relationship between their crystalline melting points and the lengths of the graft segments; that is, the longer the polypivalolactone (PPO) grafts, the higher the crystalline melting points. However, that relationship does not include polymer VIII which has a lower viscosity than the others. Melt-pressed and quenched films are clear, strong and flexible; in most cases, they are essentially amorphous. Heating the amorphous films slightly below their melting points causes them to crystallize readily. It seemed that the tendency to crystallize is greatest for the polymers with the largest amount of polypivalolactone. No thermal transitions, which could be positively attributed to the glass transition temperature of polypivalolactone, are observed by differential scanning calorimetry. This is not unexpected since the viscoelastic absorption peak associated with the Tg of polypivalolactone was reported to be very low in intensity. (J. Noah and R. E. Prudhomme, *Macromolecules*, 12, 300 (1979)).

Solubilites of the grafted copolymers vary depending upon whether they are amorphous or crystalline. The melt-quenched forms of polymers III, IV and VI are either dissolved, or swollen by, halocarbon and aromatic hydrocarbon solvents. Polymer VII, which can not be quenched to a completely amorphous state, is unaffected by those solvents probably due to its high pivalolactone (PVL) content. Facile crystallization of the quenched films is accomplished by heating them to within 10°–15° C. of their melting temperatures, after which the crystallized films tend to be brittle, but are unaffected by halocarbon and aromatic hydrocarbon solvents.

Wide angle x-ray scattering (WAXS) data has been obtained from these polymeric formulations. The diffractograms of PPO and PPO with 9% carboxylation are substantially similar for the essentially amorphous materials. However, the diffractogram for the melt-quenched specimen with 13 PVL segments/graft has an observably different shape indicating structural change due to the disturbing presence of the PVL graft. The comparable specimen (19 PVL segments/graft) reveals the ease of crystallization of PVL segments since it was not possible to produce this polymer in the amorphous state by melt-quenching. There is, in general, an increase in crystalline order with increasing temperature/time histories for both materials, the 19 segment series displaying the greater tendency toward achieving order. The reflections being developed in these two series are apparently shifting toward those characteristic of PVL.

TABLE I

PROPERTIES OF GRAFT COPOLYMERS FROM POLY(2,6-DIMETHYLPHENYLENE OXIDE) AND PIVALOLACTONE

| POLYMER[A] | GRAFT SITES[B] | PVL GRAFT[C] | INH[D] | TM[E] |
|---|---|---|---|---|
| I PPO | — | — | 0.60 | 250° C. |
| II PPO—CO$_2$H | 9% | — | .64 | 225° C. |
| III PPO—PVL | 9% | 13 | .76 | 168–172° C. |
| IV PPO—PVL | 9% | 19 | .71 | 185–197° C. |
| V PPO—CO$_2$H | 22% | — | .69 | 200° C. |
| VI PPO—PVL | 22% | 6 | .65 | 138–142° C. |
| VII PPO—PVL | 22% | 12 | .68 | 169–174° C. |
| VIII PPO—PVL | 22% | 20 | .45 | 175–185° C. |

TABLE I-continued

PROPERTIES OF GRAFT COPOLYMERS
FROM POLY(2,6-DIMETHYLPHENYLENE OXIDE)
AND PIVALOLACTONE

| POLYMER[A] | GRAFT SITES[B] | PVL GRAFT[C] | INH[D] | TM[E] |
|---|---|---|---|---|
| IX PPO—PVL | 9% | 50 | .78 | 210–216° C. |

[A] PPO = Poly(2,6-dimethylphenylene oxide); PVL = Pivalolactone; PPO—$CO_2H$ = Carboxylated PPO; PPO—PVL = Polypivalolactone grafted onto PPO—$CO_2H$.
[B] % of carboxyl groups based on the number of phenylene oxide moieties in the polymer.
[C] Number of segments ("A" in FIG. 1).
[D] Inherent Viscosity at 1% Concentration of meta cresol at 30° C.
[E] Obtained with Dupont 990 Thermal Analyzer with Standard DSC Cell at 20° C./Min.

The diffractograms of crystallized specimens of PVL and PPO are compared with crystallized specimens of PPO having 9 and 22% carboxylation and containing varying numbers of pivalolactone segments/graft. While all other specimens were obtained through annealing, such annealing failed to produce noticeable crystallization in the specimens containing 22% carboxylation and therefore solvent crystallization was used for these two specimens. The diffractograms of the grafted formulations are, in effect, superpositions of the PVL and PPO diffractograms. On the basis of the referenced structure for PVL (G. Perego, A. Melis, and M. Cesari, *Makromol. Chem.*, 157, 269 (1972)) it was possible to index major reflections occurring at 11.34, 15.15, and 22.8° (2θ) as, respectively, (100), (020), and (200). Reflections also occur in the WAXS data for grafted formulations. There is, in general, increasing crystalline order with increased PVL segments/graft for similar anealings and decreasing order with increasing carboxylation.

In summary, a novel copolyether-polyester system has resulted from the anionic graft polymerization of PVL onto the poly(2,6-dimethylphenylene oxide) backbone. The highly crystalline polypivalolactone graft side-chains dominate the amorphous polyether backbone. Wide angle x-ray scattering was used to study two series of the graft polyether-polyesters with differing graft densities and graft segment lengths. A general increase in crystalline order with increased graft segment length was observed, while decreasing order was noted for increased graft density.

The polymers of this system are useful in applications as matrix resins. More particularly, these polymers will serve as excellent materials for fabrication of parts for commercial aircraft. This is due to the ability of these polymers to be fabricated at lower temperatures than similar materials, as well as the resistance of these polymers to the solvents and liquids used on and around commercial aircraft. These polymers may prove suitable for other matrix resin applications.

The following examples are presented in order to better illustrate the nature and practice of the invention.

EXAMPLE 1

A quantity of carboxylated poly(2,6-dimethylphenylene oxide) was prepared, using a procedure reported by Xie, et al. (*J. Applied Polym. Sci.*, 29, 2679 (1984)). Elemental analysis of the product indicated that carboxyl groups were present on 22% of the individual phenylene oxide moieties in the polymer.

To a solution of 1.33 g (0.01 m) of the carboxylated poly(2,6-dimethylphenylene oxide) in 40 milliliters (ml) of tetrahydrofuran (THF) in an Erlenmeyer flask was added 1.0 ml (0.001 m) of a 1 normal solution of trimethylbenzylammonium hydroxide in methanol. That quantity of base was sufficient to neutralize one-third of the carboxylic acid groups on the polyphenylene oxide. The solution was heated to near boiling (ca. 65° C.) and 3.0 ml (0.03 m) of distilled pivalolactone was added. After the polymerization solution had been heated and stirred approximately 30 minutes, the grafted polymer precipitated from solution as a granular slurry. The slurry was added to ethanol in a small blender, and a fine powder was collected by filtration. The powder was washed with hydrochloric-acidified water, collected by filtration, and washed with water. The air-dried polymer weighed 4.08 g, a yield of 94%. Whereas both the initial poly(2,6-dimethylphenylene oxide) and the carboxylated polymer melted above 250° C., the polypivalolactone-grafted polymer began to melt near 135° C., with a crystalline melting point peaking at 165° C., as determined by differential scanning calorimetry. The inherent viscosity of the graft copolyether-polyester was 0.68, measured at 30° C. and at a concentration of 1% in m-cresol. When this viscosity was compared with that of the carboxylated polyether from which the graft copolymer was prepared ($\mu$inh=0.69), it was apparent that very little, if any, degradation of the molecular weight of the polymer backbone had occurred during the grafting process.

A thin, opaque and somewhat brittle film was prepared by first casting a solution of the graft copolymer in m-cresol onto a glass plate and then evaporating the solvent. However, when a thin film was prepared by melt-pressing the polymer between two metal plates at 200° C., and the molten film was quenched in cold water, a tough, clear, flexible film was obtained. This film could then by crystallized by re-heating just below its 165° C. melting point. The infrared spectrum of the film confirmed the presence of the polypivalolactone from an absorption peak at 767 $cm^{-1}$, which has been shown to be characteristic of pivalolactone polymers. An elemental analysis of the polyether-polyester copolymer indicated the polypivalolactone segments were 12 monomer units long.

EXAMPLE 2

A modified poly(2,6-dimethylphenylene oxide) (PPO) containing about 22% carboxylic acid groups was used for this experiment. To a solution of 0.67 g (0.005 m) of the carboxylated PPO in 30 ml of m-cresol was added 0.5 ml of a 1 normal solution of tetrabutylammonium hydroxide in methanol. The solution was then heated to 60°–65° C., stirred with a magnetic stirring bar, and 3.75 ml (3.75 g, 0.0375 m) of distilled pivalolactone was added. Within 3 hours, the solution had become viscous. Stirring, with heat, was continued for a total of 6 hours, followed by 16 hours of stirring at room temperature. This viscous, but still homogeneous polymer solution was then treated with 1 ml of concentrated hydrochloric acid, after which it was poured into ethyl alcohol, with rapid stirring, in a household-type blender. The colorless powdered polymer, which displayed a crystalline melting point of 180°–185° C., could be melt-pressed to a clear, somewhat brittle film. This film was insoluble in chloroform and ether solvents.

EXAMPLE 3

A solution of the same carboxylated polyether described in Example 2, 0.67 g (0.005 m) in 25 ml of tetrahydrofuran, was treated with 0.05 ml of a 1 normal solution of tetrabutylammonium hydroxide in methanol. To the resulting solution, heated to 60°-65° C., was added 0.9 ml (0.09 gm, 0.009 m) of pivalolactone. The solution was stirred for 2½ hours at 60°-65° C., and then at room temperature for a total of 88 hours. After that period, the polymer solution had gelled, but it easily redissolved in the tetrahydrofuran solvent when heated to 60° C.

The warm solution was poured into water with vigorous stirring in a household-type blender to give a colorless powder. The yield of dry powdered polymer was 1.50 g (96%). The inherent viscosity of the polymer (1% in m-cresol at 30° C.) was 0.65, indicating little degradation during the grafting operation, since the inherent viscosity of the starting carboxylated PPO was 0.68. The graft copolymer, as prepared, showed a broad melting range from about 115° C. to 140° C. However, when it was heated for 30 minutes at 130° C., it melted sharply at 138°-142° C., demonstrating that the pivalolactone polymer graft segments had crystallized. Elemental analysis of the grafted copolymer disclosed the lengths of the polypivalolactone segments to be about six pivalolactone units long.

Clear, strong films could be cast from 1,1,2,2-tetrachloroethane solution onto glass plates. Quenching of the dry film, after heating them on the glass plate above 150° C., gave soft, drapeable films, while heating the quenched films to 130° C. caused them to rigidize to stiff, snappy films. The quenched films were re-soluble in tetrachloroethane, but the crystallized film was no longer soluble in tetrachloroethane.

EXAMPLE 4

A carboxylated poly(2,6-dimethylphenylene oxide) containing nine carboxylic acid groups per 100 PPO monomer units was prepared. A solution of 1.24 g (0.010 m) of the starting polymer (containing 0.0009 m of carboxylic acid groups) was dissolved in 40 ml of dry tetrahydrofuran (THF) in a 50 ml Erlenmeyer flask, equipped with a magnetic stirring bar. The polymer solution was heated to about 50° C. and 0.03 ml of a 1 normal solution of tetrabutylammonium hydroxide in methanol was added, followed by 0.9 ml (0.009 m) of pivalolactone. This quantity of pivalolactone represented a graft segment of 13 pivalolactone units per carboxylic acid site. Polymerization for 4 hours at 60°-65° C. and 16 hours at room temperature gave a copolymer which gelled in THF at room temperature, but could be dissolved in hot THF. The addition of one milliliter of concentrated hydrochloric acid in 3 ml of THF generated free carboxyl groups on the polypivalolactone grafts. Workup of the polymer in water gave a 98% yield. The polymer, as prepared, had a broad melting range of 150°-170° C., but when heated 30 minutes at 160° C., displayed a sharp crystalline melting temperature at 168°-172° C. Neither the as-prepared polymer or the heat-crystallized polymer could be dissolved in 1,1,2,2-tetrachloroethane or chloroform.

I claim:

1. A graft copolymer composition comprising a compound having the formula:

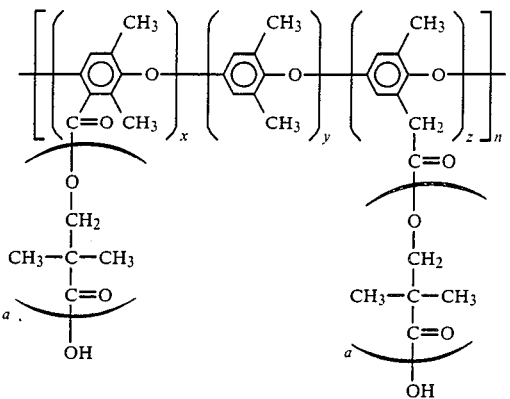

where n is an integer ranging from 10 to 10,000; $x+y+z=1$; x, y, and z are each greater than 0; m is a positive real number corresponding to the number of moles of pivalolactone consumed in the synthesis of this compound; and a is at least 1 and equal to $$\frac{m}{(x+z)n}.$$

2. A process for preparing a graft copolymer containing recurring units having the formula:

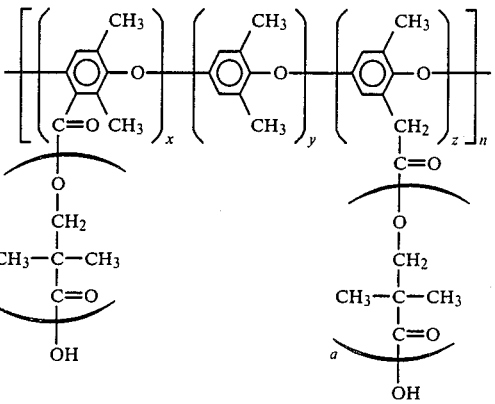

where n is an integer ranging from 10 to 10,000; $x+y+z=1$; x, y, and z are each greater than 0; m is a positive real number corresponding to the number of pivalolactone consumed in the synthesis of this graft copolymer; and a is at least 1 and equal to $$\frac{m}{(x+z)n};$$

comprising the steps of
(a) dissolving a carboxylated polyphenylene oxide polymer in a solvent;
(b) converting a number of the carboxyl groups of said carboxylated polyphenylene oxide polymer to ionic carbonyl groups;
(c) adding pivalolactone to said solvent having said polyphenylene oxide polymer containing the ionic carbonyl groups dissolved therein, to form a copolymer having the formula:

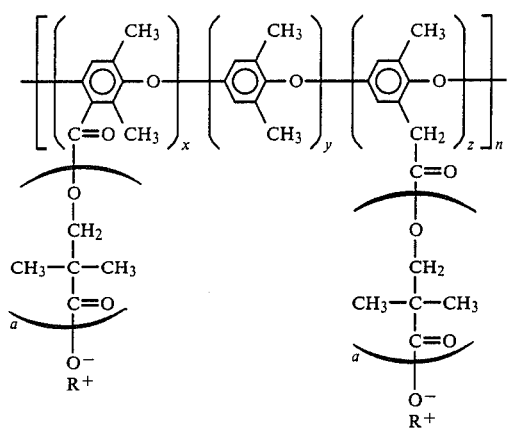

where R is a monovalent ionic radical; and
(d) adding acid to said copolymer to produce said graft copolymer.

3. The process of claim 2 wherein said solvent comprises tetrahydrofuran.

4. The process of claim 2 wherein said solvent comprises m-cresol.

5. The process of claim 2 wherein said conversion of said carboxyl groups of said carboxylated polyphenylene oxide polymer is accomplished by addition of a solution comprising a compound having the formula $R_4N^+OH^-$ wherein R is selected from the group consisting of hydrogen, alkyl and aryl.

6. The process of claim 2 wherein said acid comprises hydrochloric acid.

* * * * *